United States Patent
Ishikawa

(10) Patent No.: US 9,407,396 B2
(45) Date of Patent: Aug. 2, 2016

(54) WAVELENGTH MULTIPLEXING APPARATUS AND METHOD

(71) Applicant: FUJITSU LIMITED, Kawasaki-shi, Kanagawa (JP)

(72) Inventor: Eiji Ishikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 83 days.

(21) Appl. No.: 14/323,356

(22) Filed: Jul. 3, 2014

(65) Prior Publication Data
US 2015/0016822 A1 Jan. 15, 2015

(30) Foreign Application Priority Data
Jul. 11, 2013 (JP) .................. 2013-145830

(51) Int. Cl.
*H04J 14/02* (2006.01)
(52) U.S. Cl.
CPC ......... *H04J 14/0257* (2013.01); *H04J 14/0221* (2013.01); *H04J 14/0224* (2013.01)
(58) Field of Classification Search
CPC . H04J 14/0257; H04J 14/0208; H04J 14/022; H04J 14/0224; H04J 14/0213; H04J 14/021; H04J 14/0221; H04J 14/02573; H04B 10/07953; H04B 10/506; H04B 10/0799
USPC .................. 398/79, 90, 91, 93, 94, 95, 25, 38
See application file for complete search history.

(56) References Cited

U.S. PATENT DOCUMENTS

| | | | | |
|---|---|---|---|---|
| 5,949,562 A * | 9/1999 | Kubota | ............... | H04J 14/0224 398/79 |
| 6,101,014 A * | 8/2000 | Majima | ............... | H04J 14/0224 398/1 |
| 6,510,000 B1 * | 1/2003 | Onaka | ..................... | H01S 3/302 359/334 |
| 6,535,289 B1 | 3/2003 | Baney et al. | | |
| 6,560,015 B1 * | 5/2003 | Cao | ....................... | G02B 5/3083 359/485.04 |
| 6,654,561 B1 * | 11/2003 | Terahara | ............ | H04B 10/0799 398/25 |

(Continued)

FOREIGN PATENT DOCUMENTS

| | | |
|---|---|---|
| JP | 2002-44021 | 2/2002 |
| JP | 2010-098544 | 4/2010 |

(Continued)

*Primary Examiner* — Hibret Woldekidan
(74) *Attorney, Agent, or Firm* — Staas & Halsey LLP

(57) ABSTRACT

A wavelength multiplexing apparatus includes: a dividing unit to divide a multiplexed optical signal into a plurality of groups each including a plurality of channels; a designating unit to designate, for each group, an arbitrary channel as a designated channel and to designate an adjacent channel in a predetermined frequency direction; an acquisition unit to acquire a first optical level at a central wavelength in the designated channel and a second optical level at a wavelength at which the designated channel and the adjacent channel interfere with each other; a comparison unit to compare a determined ratio of the second optical level to the first optical level with a reference ratio of a third optical level to the first optical level; and an adjustment unit to adjust a wavelength spacing between the designated channel and the adjacent channel in the group, based on a result of the comparison.

14 Claims, 9 Drawing Sheets

(56) References Cited

U.S. PATENT DOCUMENTS

| | | | | |
|---|---|---|---|---|
| 7,756,417 B2 * | 7/2010 | Takeuchi | ............. | H04B 10/077 398/158 |
| 8,004,751 B2 * | 8/2011 | Onaka | ................. | H01S 3/06758 359/334 |
| 8,054,455 B2 * | 11/2011 | Sugaya | ................. | G02B 6/264 356/73.1 |
| 8,447,182 B2 * | 5/2013 | Bouda | .................... | H04J 14/02 398/68 |
| 9,184,852 B2 * | 11/2015 | Naito | .................... | H04B 10/60 |
| 2001/0022684 A1 * | 9/2001 | Kobayashi | ............ | H01S 3/1301 359/341.41 |
| 2003/0095323 A1 * | 5/2003 | Onaka | .................... | H01S 3/302 359/334 |
| 2010/0239260 A1 * | 9/2010 | Oikawa | ............ | H04B 10/07953 398/81 |
| 2010/0271093 A1 * | 10/2010 | Matsubara | ................ | G06F 1/10 327/161 |
| 2011/0255877 A1 | 10/2011 | Nakashima et al. | | |
| 2012/0224253 A1 * | 9/2012 | Kobayashi | ............ | H01S 3/1301 359/334 |

FOREIGN PATENT DOCUMENTS

| | | |
|---|---|---|
| JP | 2011-228819 | 11/2011 |
| JP | 2012-23607 | 2/2012 |

* cited by examiner

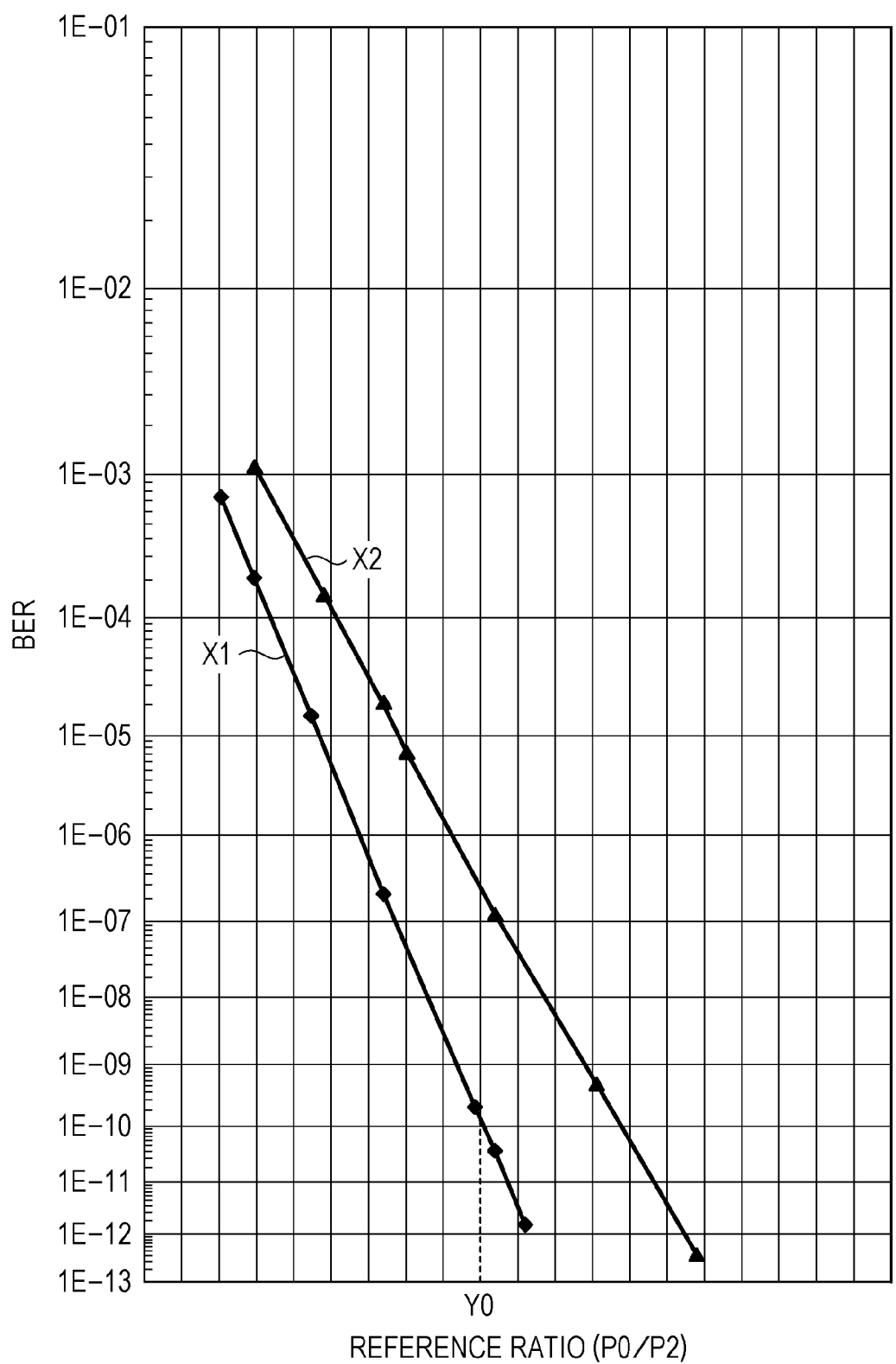

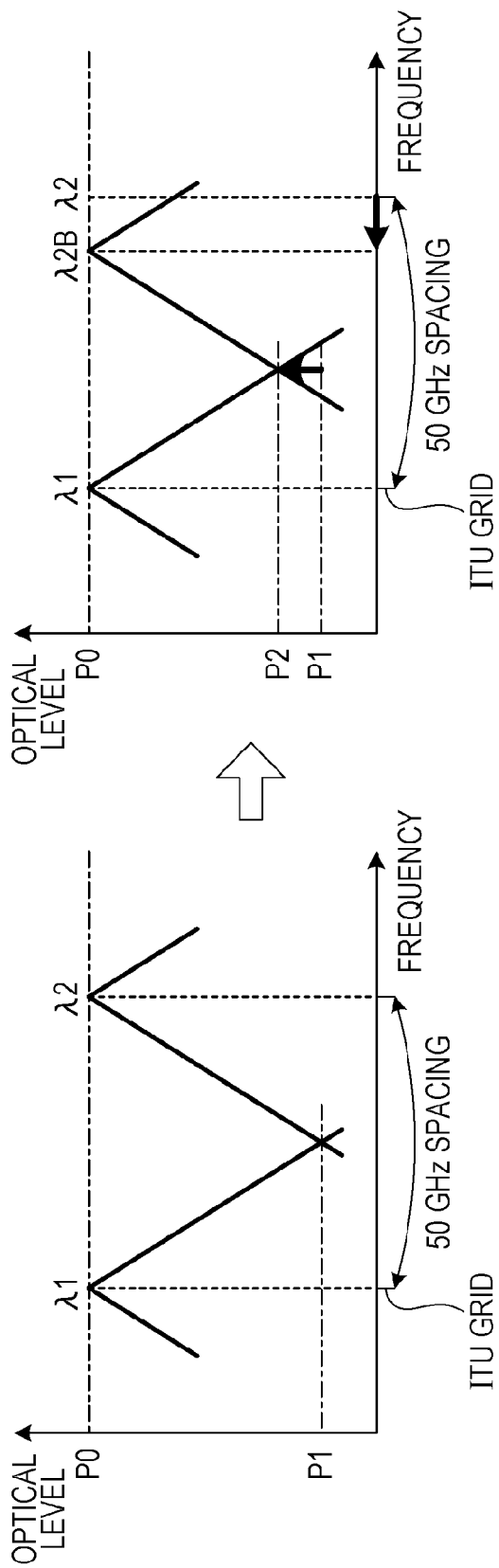

US 9,407,396 B2

WAVELENGTH MULTIPLEXING APPARATUS AND METHOD

CROSS-REFERENCE TO RELATED APPLICATION

This application is based upon and claims the benefit of priority of the prior Japanese Patent Application No. 2013-145830 filed on Jul. 11, 2013, the entire contents of which are incorporated herein by reference.

FIELD

The embodiments discussed herein are related to a wavelength multiplexing apparatus and method.

BACKGROUND

Multiplexed optical signals, such as high-speed wavelength division multiplexing (WDM) signals at 100 Gbps or the like, have spectra that vary depending upon the wavelength spacing between multiplexed channels. For example, when a channel to be multiplexed is added to a WDM signal, the added channel and an adjacent channel in operation, which is adjacent to the added channel, interfere with each other, resulting in a reduction in the signal quality. A technique for reducing interference by increasing the wavelength spacing between the channels in the WDM signal is conceivable in order to enhance the signal quality. However, if the wavelength spacing is excessively increased, the number of channels in which wavelengths can be multiplexed decreases. Consequently, the transmission capacity decreases, and the wavelength utilization efficiency also declines.

Accordingly, there is a technique for adjusting the signal quality and the wavelength utilization efficiency in a WDM signal. One example of such a technique is a method for adjusting the channel spacing for each wavelength while monitoring the signal quality corresponding to the wavelength spacing between the channels in a WDM signal.

Examples of related techniques are disclosed in Japanese Laid-open Patent Publication No. 2012-23607, Japanese Laid-open Patent Publication No. 2002-44021, Japanese Laid-open Patent Publication No. 2011-228819, and Japanese Laid-open Patent Publication No. 2010-098544.

SUMMARY

According to an aspect of the invention, a wavelength multiplexing apparatus includes: a dividing unit configured to divide a multiplexed optical signal, in which optical signals of channels in different wavelength bands are multiplexed, into a plurality of groups each including a plurality of channels; a designating unit configured to designate, for each group, an arbitrary channel of the channels in the group as a designated channel and to designate an adjacent channel that is adjacent to the designated channel in a predetermined frequency direction; an acquisition unit configured to acquire a first optical level at a central wavelength in the designated channel and a second optical level at a wavelength at which the designated channel and the adjacent channel interfere with each other; a comparison unit configured to compare a determined ratio of the second optical level to the first optical level with a reference ratio of a third optical level to the first optical level; and an adjustment unit configured to adjust a wavelength spacing between the designated channel and the adjacent channel in the group, based on a result of the comparison.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a graph depicting one example of characteristics of a BER versus a reference ratio;

FIGS. 5A and 5B depict one example of processing for performing adjustment in a direction in which the wavelength spacing is reduced;

DESCRIPTION OF EMBODIMENTS

With a scheme in which the wavelength spacings of all channels in a WDM signal are gradually increased for each wavelength while monitoring the signal quality corresponding to the wavelength spacings by using forward error correction (FEC), the time for monitoring the signal quality and the time for adjusting the wavelength spacing increase, thus involving a large amount of time to start up the system.

Embodiments of a wavelength multiplexing apparatus and method which are capable of reducing the time for adjusting the wavelength spacings in a multiplexed optical signal will be described below with reference to the accompanying drawings. The present embodiments are not intended to limit the technology disclosed herein.

[First Embodiment]

Figure 1:
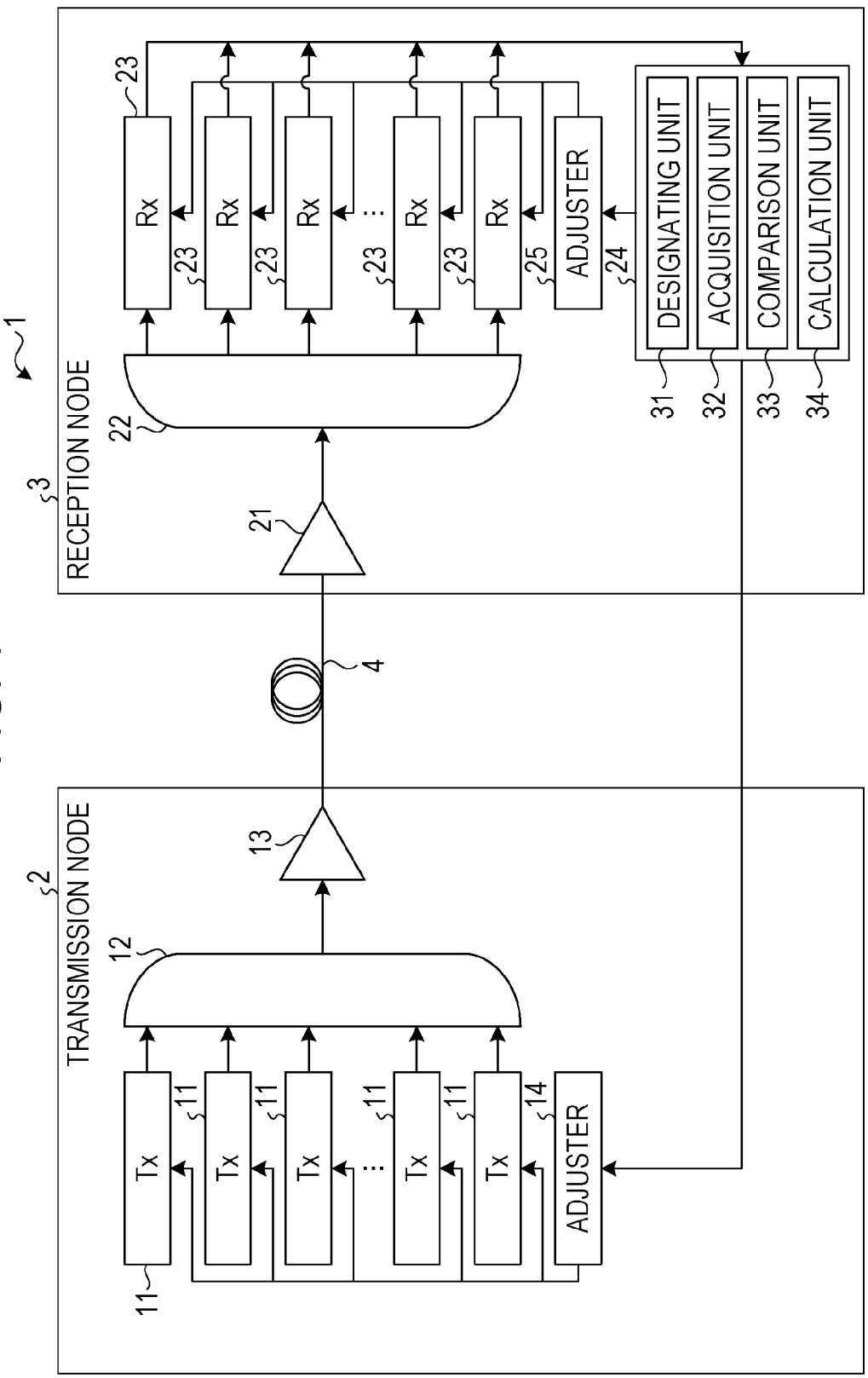
FIG. 1 is a block diagram illustrating one example of a WDM transmission system according to a first embodiment.

FIG. 1 is a block diagram illustrating an example of a WDM transmission system according to a first embodiment. The WDM transmission system 1 illustrated in FIG. 1 has a transmission node 2, a reception node 3, and an optical fiber 4 that provides a connection between the transmission node 2 and the reception node 3. The WDM transmission system 1 is an optical filterless system employing a digital coherent scheme for the transmission node 2 and the reception node 3. The transmission node 2 has a plurality of optical transmitters (Tx) 11, an optical multiplexer 12, an optical amplifier 13, and an adjuster 14. The optical transmitters 11 correspond to, for example, digital coherent transmitters and transmit, for example, optical signals in channels not only in mutually different wavelength bands defined by the International Telecommunication Union (ITU) grid but also in gridless wavelength bands. The optical multiplexer 12 multiplexes the optical signals from the optical transmitters 11 and outputs a resulting WDM signal. The optical multiplexer 12 is, for example, a wavelength non-selective device, such as a star coupler. The optical amplifier 13 amplifies the WDM signal output from the optical multiplexer 12 and outputs the amplified WDM signal to the optical fiber 4.

Figure 2:
FIG. 2 depicts one example of the spectrum of wavelength bands in a WDM signal.

FIG. 2 depicts an example of the spectrum of wavelength bands in a WDM signal. The WDM signal depicted in FIG. 2 has, for example, a spectrum containing 96 wavelength bands $\lambda 1$ to $\lambda 96$. In addition, the WDM signal is grouped, for example, in units of 12 wavelength bands defined by the ITU grid. For example, the wavelength bands $\lambda 1$ to 12 are set as a first group, the wavelength bands $\lambda 13$ to $\lambda 24$ are set as a second group, the wavelength bands $\lambda 25$ to $\lambda 36$ are set as a third group, and the wavelength bands $\lambda 37$ to $\lambda 48$ are set as a fourth group. The wavelength bands $\lambda 49$ to $\lambda 60$ are set as a fifth group, the wavelength bands $\lambda 61$ to $\lambda 72$ are set as a sixth group, the wavelength bands $\lambda 73$ to $\lambda 84$ are set as a seventh group, and the wavelength bands $\lambda 85$ to $\lambda 96$ are set as an eighth group.

The wavelength band at the highest frequency, which is the maximal wavelength, among the wavelength bands in each group is set as a signal-less band serving as an unused channel. For example, the wavelength band at the highest frequency in the first group is $\lambda 12$, the wavelength band at the highest frequency in the second group is $\lambda 24$, the wavelength band at the highest frequency in the third group is $\lambda 36$, and the wavelength band at the highest frequency in the fourth group is $\lambda 48$. The wavelength band at the highest frequency in the fifth group is $\lambda 60$, the wavelength band at the highest frequency in the sixth group is $\lambda 72$, the wavelength band at the highest frequency in the seventh group is $\lambda 84$, and the wavelength band at the highest frequency in the eighth group is $\lambda 96$. The wavelength band at the lowest frequency, which is the minimal wavelength, among the wavelength bands in each group is set as a fixed channel that is not to be subjected to adjustment described below. For example, the wavelength band at the lowest frequency in the first group is $\lambda 1$, the wavelength band at the lowest frequency in the second group is $\lambda 13$, the wavelength band at the lowest frequency in the third group is $\lambda 25$, the wavelength band in the lowest frequency in the fourth group is $\lambda 37$, and the wavelength band at the lowest frequency in the fifth group is $\lambda 49$. The wavelength band at the sixth group is $\lambda 61$, the wavelength band at the lowest frequency in the seventh group is $\lambda 73$, and the wavelength band at the lowest frequency in the eighth group is $\lambda 85$.

Referring back to FIG. 1, the reception node 3 includes an optical amplifier 21, an optical demultiplexer 22, a plurality of optical receivers (Rx) 23, a controller 24, and an adjuster 25. The optical amplifier 21 amplifies the WDM signal, received from the optical fiber 4, so as to compensate for transmission loss in the WDM signal. The optical demultiplexer 22 demultiplexes the WDM signal amplified by the optical amplifier 21. The optical demultiplexer 22 is, for example, a wavelength non-selective device, such as a star coupler.

The optical receivers 23 correspond to, for example, digital coherent receivers and receive, in the WDM signal, optical signals in channels in wavelength bands corresponding to the respective optical transmitters 11. Each optical receiver 23 has a built-in local light source (not illustrated). By setting the local light source to have the same wavelength as that of the signal light, the optical receiver 23 receives an optical signal in an arbitrary one of multiple wavelength bands. Each optical receiver 23 further performs a Fourier transform to obtain the spectrum of the optical signal in the arbitrary wavelength band.

The controller 24 includes a designating unit 31, an acquisition unit 32, a comparison unit 33, and a calculation unit 34. The controller 24 divides the WDM signal into, for example, first to eighth groups, each having 12 wavelength bands. The designating unit 31 designates an arbitrary channel in each group as a designated channel and also designates, as an adjacent channel, the channel that is adjacent to the designated channel in a frequency-increasing direction. The acquisition unit 32 acquires the optical-signal spectra obtained via the Fourier transforms performed by the optical receivers 23. For example, the acquisition unit 32 acquires, from the optical receivers 23, the spectra of the channels in $\lambda 1$ to $\lambda 96$ in the WDM signal. The acquisition unit 32 acquires a peak level P0 that is the optical level at the central wavelength for each channel (see FIGS. 4A and 4B). The acquisition unit 32 also acquires an optical level P1 at a wavelength at which the designated channel and the adjacent channel interfere with each other (see FIGS. 4A and 4B).

The comparison unit 33 determines a determined ratio P0/P1, based on the peak level P0 in the designated channel and the optical level P1 at the wavelength at which the designated channel and the adjacent channel interfere with each other. The comparison unit 33 obtains a reference ratio P0/P2 to be compared with the determined ratio P0/P1. P2 represents an optical level that is a reference optical level at the wavelength at which the designated channel and the adjacent channel interfere with each other and that is to be guaranteed in a network in a communication environment. FIG. 3 is a graph depicting characteristics of bit error rate (BER) versus the reference ratio P0/P2. The BER represents a bit error rate in the network. For example, 1E-10 corresponds to a communication environment where one bit error every 10 billion bits is guaranteed, and 1E-12 corresponds to a communication environment where one bit error every trillion bits is guaranteed. The gradients and the positions of the straight lines in the characteristics depicted in FIG. 3 vary depending on differences in wavelength dispersion values in the network and the degree of nonlinear effects. The characteristic X1 is, for example, a characteristic of the BER versus the reference ratio P0/P2 in the WDM transmission system 1. The characteristic X2 is a characteristic of BER versus reference ratio P0/P2 in another transmission system. When a communication environment where the BER is 1E-10 is guaranteed in the WDM transmission system 1, the comparison unit 33 obtains a reference ratio (P0/P2) Y0 corresponding to 1E-10 from the characteristic X1.

In addition, the comparison unit 33 compares the determined ratio P0/P1 with the reference ratio P0/P2, and based on the result of the comparison, the calculation unit 34 sends, to the adjuster 25 in the reception node 3 and the adjuster 14 in the transmission node 2, an adjustment signal for adjusting the frequency at the central wavelength in the adjacent channel. A communication path that is different from the optical fiber 4 is used to provide a connection between the controller 24 in the reception node 3 and the adjuster 14 in the transmission node 2.

When the determined ratio P0/P1 is smaller than the reference ratio P0/P2, the calculation unit 34 generates an adjustment signal for adjusting the central wavelength in the adjacent channel in a direction in which the wavelength spacing between the designated channel and the adjacent channel is increased, that is, in the frequency-increasing direction. The adjustment signal includes an adjustment amount by which the central wavelength in the adjacent channel is to be adjusted in the frequency-increasing direction and also identification information for identifying the optical receiver 23 and the optical transmitter 11 for which the central wavelength in the adjacent channel is to be adjusted. When the central wavelength is to be adjusted in the direction in which the wavelength spacing is increased, interference between the designated channel and the adjacent channel in the group is mitigated, and the signal quality is improved.

When the determined ratio P0/P1 is larger than the reference ratio P0/P2, the calculation unit 34 generates an adjustment signal for adjusting the central wavelength in the adjacent channel in the direction in which the wavelength spacing between the designated channel and the adjacent channel is reduced, that is, in a frequency-decreasing direction. When the central wavelength is adjusted in the direction in which the wavelength spacing is reduced, the adjustment is performed so that interference between the designated channel and the adjacent channel in the group reaches a predetermined reference level or below, so that a decline in the wavelength utilization efficiency is suppressed.

Based on the identification information in the adjustment signal from the controller 24, the adjuster 25 in the reception node 3 identifies the optical receiver 23 which corresponds to the adjacent channel and for which the central wavelength in the adjacent channel is to be adjusted. Based on the adjustment amount in the adjustment signal, the adjuster 25 adjusts the central wavelength in the adjacent channel for the identified optical receiver 23.

Based on the identification information in the adjustment signal from the controller 24, the adjuster 14 in the transmission node 2 also identifies the optical transmitter 11 which corresponds to the adjacent channel and for which the central wavelength in the adjacent channel is to be adjusted. Based on the adjustment amount in the adjustment signal, the adjuster 14 adjusts the central wavelength in the adjacent channel for the identified optical transmitter 11.

The calculation unit 34 repeatedly sends the adjustment signal to the adjuster 25 in the reception node 3 and the adjuster 14 in the transmission node 2 until the determined ratio P0/P1 for the designated channel and the adjacent channel in the group becomes equal to the reference ratio P0/P2.

For example, when the determined ratio P0/P1 for the designated channel $\lambda 1$ and the adjacent channel $\lambda 2$ in the first group becomes equal to the reference ratio P0/P2, the designating unit 31 designates the adjacent channel $\lambda 2$ as a designated channel. In addition, the designating unit 31 designates, as an adjacent channel, the channel $\lambda 3$ that is adjacent to the designated channel $\lambda 2$ in the frequency-increasing direction. The calculation unit 34 then repeatedly sends the adjustment signal to the adjuster 25 in the reception node 3 and the adjuster 14 in the transmission node 2 until the determined ratio P0/P1 for the designated channel $\lambda 2$ and the adjacent channel $\lambda 3$ becomes equal to the reference ratio P0/P2.

Thereafter, for example, when the second channel $\lambda 10$ from the last channel $\lambda 12$ in the first group is designated, the calculation unit 34 calculates an adjustment signal by which the determined ratio P0/P1 for the designated channel $\lambda 10$ and the adjacent channel $\lambda 11$ becomes equal to the reference ratio P0/P2. When the determined ratio P0/P1 for the designated channel $\lambda 10$ and the adjacent channel $\lambda 11$ in the first group becomes equal to the reference ratio P0/P2, this means that the calculation unit 34 has completed the adjustment for the wavelength spacings of all of the channels $\lambda 1$ to $\lambda 11$ in the first group. The calculation unit 34 and the adjusters 14 and 25 serve as, for example, adjustment units.

The controller 24 sequentially generates, for each group, an adjustment signal so that the determined ratio P0/P1 for the designated channel and the adjacent channel in the same group becomes equal to the reference ratio P0/P2. Based on the adjustment signal, the adjuster 25 in the reception node 3 and the adjuster 14 in the transmission node 2 sequentially adjust, for each group, the wavelength spacing between the designated channel and the adjacent channel.

In other words, the controller 24 executes, on the groups in parallel, the processing for sequentially generating an adjustment signal for adjusting the central wavelength in the adjacent channel for each group. The adjuster 25 in the reception node 3 and the adjuster 14 in the transmission node 2 then execute, on the groups in parallel, the processing for adjusting the wavelength spacing between the designated channel and the adjacent channel. In the WDM transmission system 1, when the adjustment of the wavelength spacings of all of the channels in each group in the WDM signal is completed, the adjustment of the wavelength spacings of all of the channels in the WDM signal is completed.

Figure 4A:
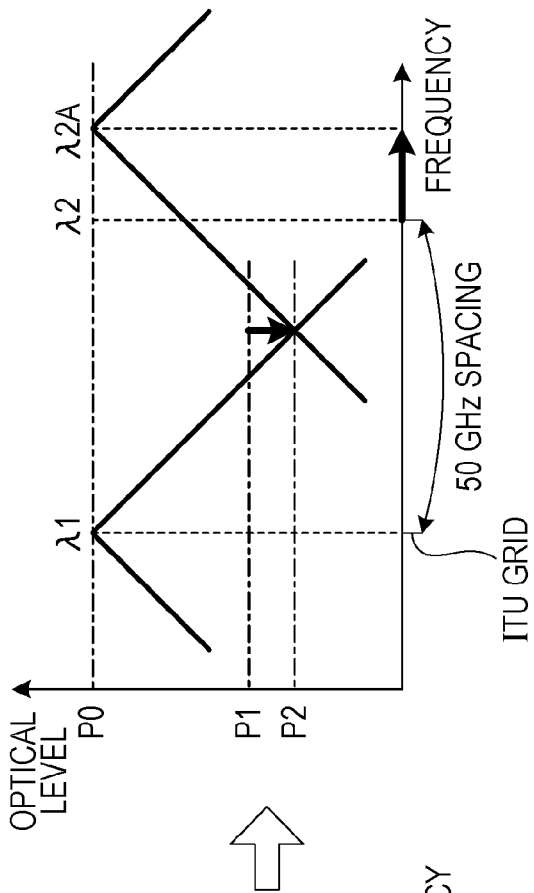
FIGS. 4A and 4B depict one example of processing for performing adjustment in a direction in which a wavelength spacing is increased.
Figure 4B:
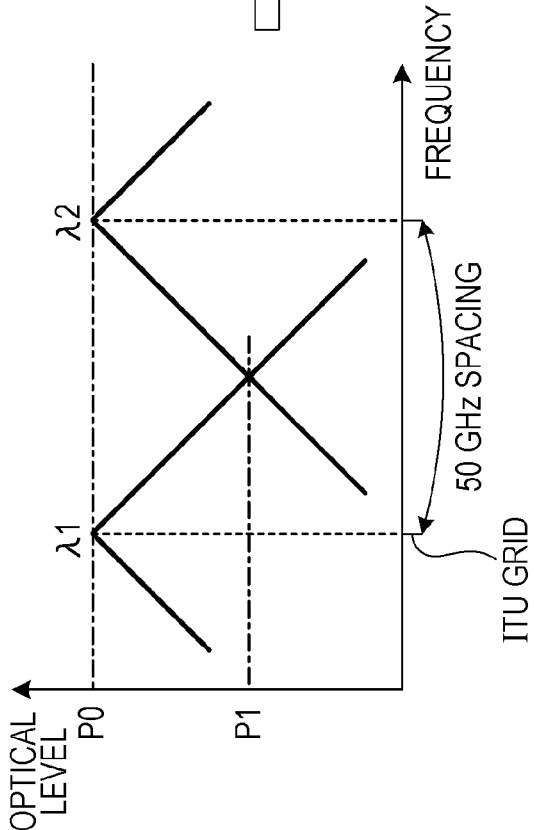

FIGS. 4A and 4B depict an example of processing for performing adjustment in the direction in which the wavelength spacing is increased. In the example in FIGS. 4A and 4B, adjustment is performed on the channels $\lambda 1$ and $\lambda 2$ in the first group, and the wavelength spacing between the channel $\lambda 1$ and the channel $\lambda 2$ is assumed to be 50 GHz. The designating unit 31 designates the channel $\lambda 1$ in the first group as a designated channel and designates, as an adjacent channel, the channel $\lambda 2$ that is adjacent to the designated channel $\lambda 1$ in the frequency-increasing direction. The acquisition unit 32 then acquires the peak level P0 at the central wavelength in the designated channel $\lambda 1$ and the optical level P1 at a wavelength at which the designated channel $\lambda 1$ and the adjacent channel $\lambda 2$ interfere with each other, as illustrated in FIG. 4A.

Next, when the determined ratio P0/P1 for the designated channel $\lambda 1$ and the adjacent channel $\lambda 2$ is smaller than the reference ratio P0/P2, the calculation unit 34 sends, to the adjuster 25 in the reception node 3 and the adjuster 14 in the transmission node 2, an adjustment signal for adjusting the central wavelength in the adjacent channel $\lambda 2$ in the frequency-increasing direction, as illustrated in FIG. 4B. As a result, the adjuster 25 in the reception node 3 and the adjuster 14 in the transmission node 2 perform adjustment so that the central wavelength in the adjacent channel $\lambda 2$ is shifted to a channel $\lambda 2A$ in the frequency-increasing direction. Since the frequency spacing between the designated channel $\lambda 1$ and the adjacent channel $\lambda 2A$ is increased, the optical level P1 at the wavelength at which the designated channel $\lambda 1$ and the adjacent channel $\lambda 2A$ interfere with each other decreases to the reference optical level P2. Thus, the quality of signals in the designated channel $\lambda 1$ and the adjacent channel $\lambda 2A$ in the first group improves.

FIGS. 5A and 5B depict an example of processing for performing adjustment in the direction in which the wavelength spacing is reduced. The designating unit 31 designates the channel $\lambda 1$ in the first group as a designated channel and designates, as an adjacent channel, the channel $\lambda 2$ that is adjacent to the designated channel $\lambda 1$ in the frequency-increasing direction. The acquisition unit 32 acquires the peak level P0 at the central wavelength in the designated channel $\lambda 1$ and the optical level P1 at a wavelength at which the designated channel $\lambda 1$ and the adjacent channel $\lambda 2$ interfere with each other, as illustrated in FIG. 5A.

When the determined ratio P0/P1 for the designated channel $\lambda 1$ and the adjacent channel $\lambda 2$ is larger than the reference ratio P0/P2, the calculation unit 34 sends, to the adjuster 25 in the reception node 3 and the adjuster 14 in the transmission node 2, an adjustment signal for adjusting the central wavelength in the adjacent channel $\lambda 2$ in the frequency-decreasing direction, as illustrated in FIG. 5B. As a result, the adjuster 25 in the reception node 3 and the adjuster 14 in the transmission node 2 adjust the central wavelength in the adjacent channel λ2 so that the central wavelength is shifted to a channel λ2B in the frequency-decreasing direction. Since the frequency spacing between the designated channel λ1 and the adjacent channel λ2B is reduced, the optical level P1 at the wavelength at which the designated channel λ1 and the adjacent channel λ2B interfere with each other increases to the reference optical level P2. This suppresses a decline in the utilization efficiency of wavelengths in the designated channel λ1 and the adjacent channel λ2B in the first group.

Figure 6:
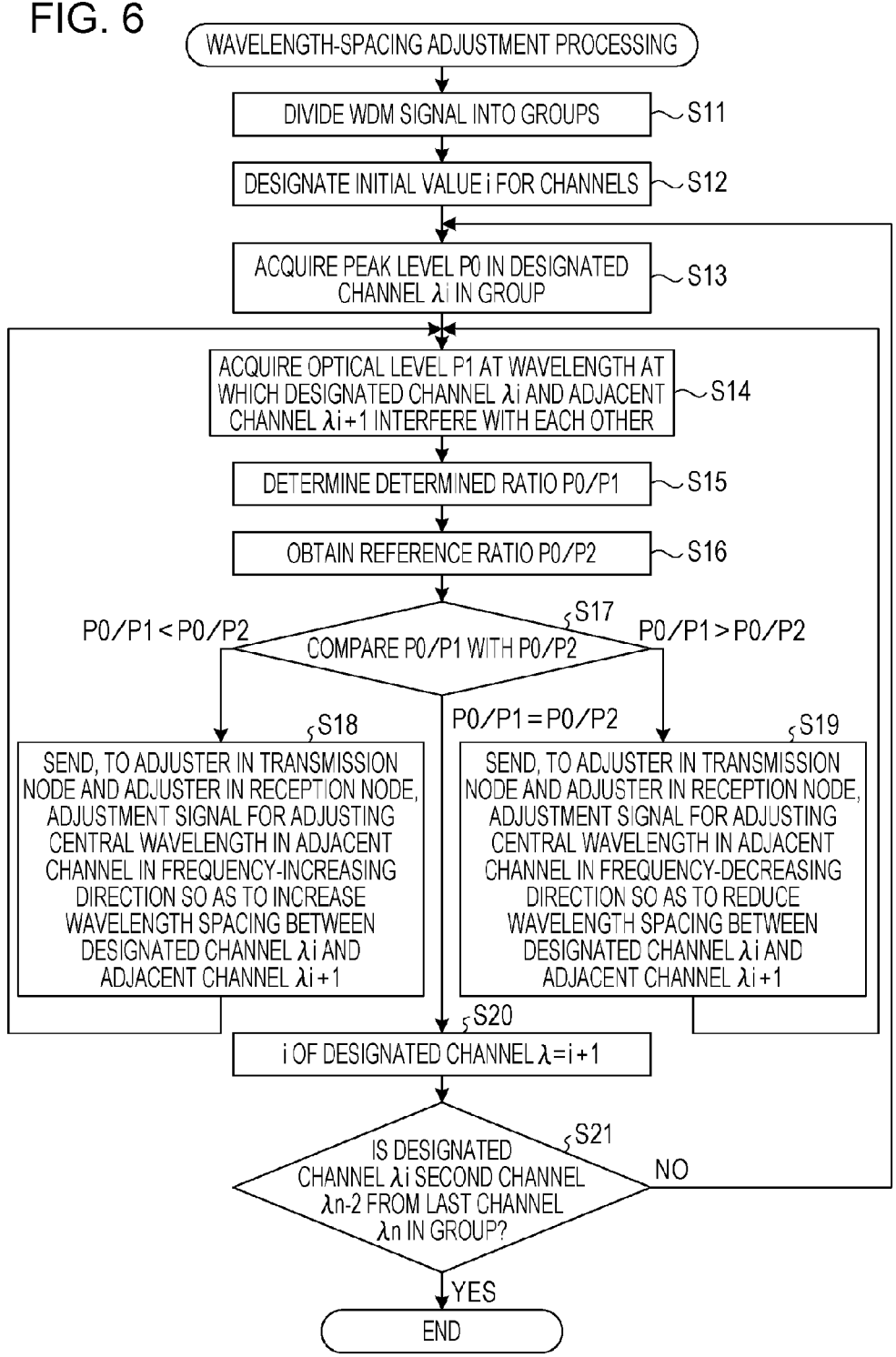
FIG. 6 is a flowchart illustrating one example of processing operations, performed by a reception node, involved in wavelength-spacing adjustment processing.

Next, a description will be given of operation of the WDM transmission system 1 according to the first embodiment. FIG. 6 is a flowchart illustrating an example of processing operations, performed by the reception node 3, involved in the wavelength-spacing adjustment processing. The wavelength-spacing adjustment processing illustrated in FIG. 6 is processing for adjusting the wavelength spacings of all of the channels in a WDM signal received from the transmission node 2.

In FIG. 6, the controller 24 in the reception node 3 divides all of the channels in the WDM signal into a preset number of groups (operation S11). The controller 24 divides the WDM signal into, for example, first to eighth groups in units of 12 wavelength bands. Thereafter, with respect to the first to eighth groups, the controller 24 executes processes in operations S12 to S21 in parallel.

The designating unit 31 in the controller 24 designates an initial value i for the channels in the group (operation S12). More specifically, the designating unit 31 designates "1" as the initial value i for the first group, designates "13" as the initial value i for the second group, designates "25" as the initial value i for the third group, and designates "37" as the initial value i for the fourth group. The designating unit 31 also designates "49" as the initial value i for the fifth group, designates "61" as the initial value i for the sixth group, designates "73" as the initial value i for the seventh group, and designates "85" as the initial value i for the eighth group.

The acquisition unit 32 in the controller 24 acquires the peak level P0 in the designated channel λi from the optical receiver 23 corresponding to the designated channel λi in the group (operation S13). After acquiring the peak level P0 in the designated channel λi, the acquisition unit 32 acquires the optical level P1 at a wavelength at which the designated channel λi and the adjacent channel λi+1 interfere with each other (operation S14). The comparison unit 33 in the controller 24 determines a determined ratio P0/P1 for the designated channel λi and the adjacent channel λi−1 (operation S15). The comparison unit 33 obtains, from the characteristic X1 illustrated in FIG. 3, a reference ratio P0/P2 corresponding to a BER in the communication environment of the WDM transmission system 1 (operation S16).

The comparison unit 33 compares the determined ratio P0/P1 with the reference ratio P0/P2 (operation S17). When the result of the comparison indicates that the determined ratio P0/P1 is smaller than the reference ratio P0/P2, the calculation unit 34 in the controller 24 calculates an adjustment amount by which the central wavelength in the adjacent channel is to be adjusted in the frequency-increasing direction and sends, to the adjuster 14 in the transmission node 2 and the adjuster 25 in the reception node 3, an adjustment signal for adjusting the central wavelength in the frequency-increasing direction (operation S18). Based on the identification information in the adjustment signal, the adjuster 25 in the reception node 3 identifies the optical receiver 23 which corresponds to the adjacent channel λi+1 and for which the central wavelength in the adjacent channel λi+1 is to be adjusted. Based on the adjustment amount in the adjustment signal, the adjuster 25 in the reception node 3 adjusts the central wavelength in the adjacent channel λi+1 in the frequency-increasing direction for the identified optical receiver 23. That is, the adjuster 25 in the reception node 3 that receives the WDM signal increases the wavelength spacing between the designated channel λi and the adjacent channel λi+1. Based on the identification information in the adjustment signal, the adjuster 14 in the transmission node 2 also identifies the optical transmitter 11 which corresponds to the adjacent channel λi+1 and for which the central wavelength in the adjacent channel λi+1 is to be adjusted. Based on the adjustment amount in the adjustment signal, the adjuster 14 in the transmission node 2 adjusts the central wavelength in the adjacent channel λi+1 in the frequency-increasing direction for the identified optical transmitter 11. That is, the adjuster 14 in the transmission node 2 that transmits the WDM signal increases the wavelength spacing between the designated channel λi and the adjacent channel λi−1.

After sending the adjustment signal to the adjuster 25 in the reception node 3 and the adjuster 14 in the transmission node 2 in operation S18, the process of the controller 24 returns to operation S14 so as to acquire the optical level P1 at a wavelength at which the designated channel λi and the adjacent channel λi+1 interfere with each other.

When the result of the comparison in operation S17 indicates that the determined ratio P0/P1 is larger than the reference ratio P0/P2, the calculation unit 34 calculates an adjustment amount by which the central wavelength in the adjacent channel is to be adjusted in the frequency-decreasing direction and sends, to the adjuster 25 in the reception node 3 and the adjuster 14 in the transmission node 2, an adjustment signal for adjusting the central wavelength in the frequency-decreasing direction (operation S19). Based on the identification information in the adjustment signal, the adjuster 25 in the reception node 3 identifies the optical receiver 23 which corresponds to the adjacent channel λi+1 and for which the central wavelength in the adjacent channel λi+1 is to be adjusted. Based on the adjustment amount in the adjustment signal, the adjuster 25 in the reception node 3 adjusts the central wavelength in the adjacent channel λi+1 in the frequency-decreasing direction for the identified optical receiver 23. That is, the adjuster 25 in the reception node 3 that receives the WDM signal reduces the wavelength spacing between the designated channel λi and the adjacent channel λi+1. Based on the identification information in the adjustment signal, the adjuster 14 in the transmission node 2 identifies the optical transmitter 11 which corresponds to the adjacent channel λi+1 and for which the central wavelength in the adjacent channel λi+1 is to be adjusted. Based on the adjustment amount in the adjustment signal, the adjuster 14 in the transmission node 2 adjusts the central wavelength in the adjacent channel λi+1 in the frequency-decreasing direction for the identified optical transmitter 11. That is, the adjuster 14 in the transmission node 2 that transmits the WDM signal reduces the wavelength spacing between the designated channel λi and the adjacent channel λi+1.

After sending the adjustment signal to the adjuster 25 in the reception node 3 and the adjuster 14 in the transmission node 2 in operation S19, the process of the controller 24 returns to operation S14 so as to acquire the optical level P1 at a wavelength at which the designated channel λi and the adjacent channel λi+1 interfere with each other.

When the result of the comparison in operation S17 indicates that the determined ratio P0/P1 and the reference ratio P0/P2 are equal to each other, the designating unit 31 designates the next designated channel λi+1 in the frequency-increasing direction (operation S20). The designating unit 31 determines whether or not the designated channel λi is the second channel λn−2 from the last channel λn in the group (operation S21). For example, for the first group, the second channel λn−2 from the last channel λn in the group corresponds to the second channel λ10 from the last channel λ12.

When the designated channel λi is the second channel λn−2 from the last channel λn (affirmative in operation S21), the controller 24 decides that the adjustment of the wavelength spacings of all of the channels in the group is completed and ends the processing operations illustrated in FIG. 6.

When the designated channel λi is not the second channel λn−2 from the last channel λn (negative in operation S21), the process of the controller 24 returns to operation S13 so as to acquire the peak level P0 in the next designated channel λi in the group.

In the wavelength-spacing adjustment processing illustrated in FIG. 6, the processes for adjusting the wavelength spacings of all of the channels in the group are independently executed on the first and eighth groups in parallel. That is, since the processes for adjusting the wavelength spacings of all of the channels in the corresponding groups are executed for the respective groups in parallel in the wavelength-spacing adjustment processing, it is possible to significantly reduce the amount of time taken for adjusting the wavelength spacings of all of the channels in a WDM signal.

The controller 24 compares the determined ratio P0/P1 for the designated channel and the adjacent channel in each group with the reference ratio P0/P2. When the determined ratio P0/P1 is smaller than the reference ratio P0/P2, the controller 24 calculates an adjustment amount by which the central wavelength in the adjacent channel is to be adjusted in the frequency-increasing direction and sends, to the adjuster 25 in the reception node 3 and the adjuster 14 in the transmission node 2, an adjustment signal for shifting and adjusting the central wavelength in the adjacent channel in the frequency-increasing direction. Based on the adjustment signal for shifting and adjusting the central wavelength in the frequency-increasing direction, the adjuster 25 in the reception node 3 increases the wavelength spacing between the designated channel and the adjacent channel in order that the central wavelength in the optical receiver 23 corresponding to the adjacent channel is shifted and adjusted in the frequency-increasing direction. Based on the adjustment signal for shifting and adjusting the central wavelength in the frequency-increasing direction, the adjuster 14 in the transmission node 2 increases the wavelength spacing between the designated channel and the adjacent channel in order that the central wavelength in the optical transmitter 11 corresponding to the adjacent channel is shifted and adjusted in the frequency-increasing direction. As a result, the wavelength spacings of all of the channels in the WDM signal are increased, thus achieving an improvement in the signal quality.

When the determined ratio P0/P1 for the designated channel and the adjacent channel in the group is larger than the reference ratio P0/P2, the controller 24 calculates an adjustment amount by which the central wavelength in the adjacent channel is to be adjusted in the frequency-decreasing direction and sends, to the adjuster 25 in the reception node 3 and the adjuster 14 in the transmission node 2, an adjustment signal for shifting and adjusting the central wavelength in the adjacent channel in the frequency-decreasing direction. Based on the adjustment signal for shifting and adjusting the central wavelength in the frequency-decreasing direction, the adjuster 25 in the reception node 3 reduces the wavelength spacing between the designated channel and the adjacent channel in order that the central wavelength in the optical receiver 23 corresponding to the adjacent channel is shifted and adjusted in the frequency-decreasing direction. Based on the adjustment signal for shifting and adjusting the central wavelength in the frequency-decreasing direction, the adjuster 14 in the transmission node 2 reduces the wavelength spacing between the designated channel and the adjacent channel in order that the central wavelength in the optical transmitter 11 corresponding to the adjacent channel is shifted and adjusted in the frequency-decreasing direction. As a result of the above-described processing, the wavelength spacings of all of the channels in the WDM signal are reduced, thus making it possible to suppress a decline in the wavelength utilization efficiency.

That is, by adjusting the wavelength spacings of all of the channels in a WDM signal, the WDM transmission system 1 mitigates interference between the channels in the WDM signal so that the interference reaches a predetermined reference level or below, thus making it possible to suppress a decline in the wavelength utilization efficiency while improving the signal quality. Moreover, since the adjustments of the wavelength spacings between the channels in the WDM signal are executed in parallel for the respective groups, it is possible to significantly reduce the adjustment time, compared with that in the related techniques.

Figure 7A:
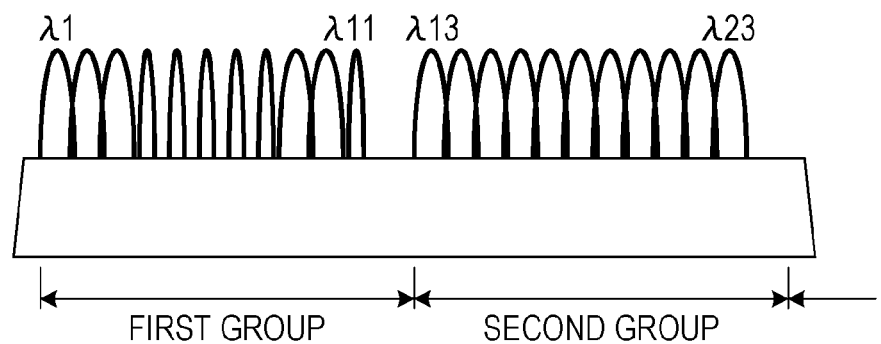
FIG. 7A depicts one example of the spectrum of wavelength bands in a WDM signal before execution of the wavelength-spacing adjustment processing, and 7B depicts one example of the spectrum of wavelength bands in a WDM signal after execution of the wavelength-spacing adjustment processing.
Figure 7B:
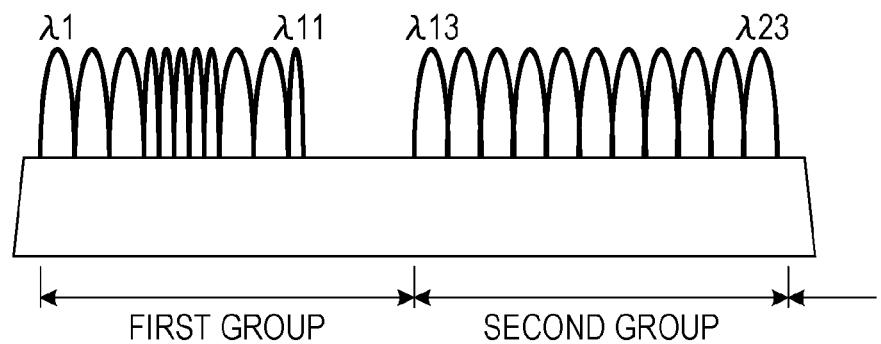

FIG. 7A depicts an example of the spectrum of wavelength bands in a WDM signal before execution of the wavelength-spacing adjustment processing, and FIG. 7B depicts an example of the spectrum of wavelength bands in a WDM signal after execution of the wavelength-spacing adjustment processing. In FIG. 7A, channels λ1 to λ12 in a first group correspond to an example in which a case in which the wavelength spacing is to be increased and a case in which the wavelength spacing is to be reduced coexist, and channels λ13 to λ23 in a second group correspond to an example of a case in which the wavelength spacing is to be increased. The wavelength spacing between the channels in each group is sequentially adjusted channel-by-channel starting from the fixed channel at the lowest frequency. As a result, in the first and second groups illustrated in FIG. 7B, it is possible to suppress a decline in the wavelength utilization efficiency while achieving an improvement in the signal quality by mitigating interference between the channels so that the interference reaches a predetermined reference level or below. Moreover, since the wavelength-spacing adjustment processing for the groups is performed in parallel, it is possible to reduce the amount of time taken until the wavelength spacings of all of the channels in a WDM signal are adjusted.

The reception node 3 in the first embodiment divides a WDM signal into groups in units of 12 wavelength bands; designates, for each group, a designated channel and an adjacent channel in the group; and acquires the peak level P0 in the designated channel and the optical level P1 at a wavelength at which the designated channel and the adjacent channel interfere with each other. Based on the result of comparison of the determined ratio P0/P1 with the reference ratio P0/P2, the reception node 3 adjusts the wavelength spacing between the designated channel and the adjacent channel in the group. Since the reception node 3 sequentially adjusts the wavelength spacing between the designated channel and the adjacent channel in each group, it is possible to suppress a decline in the wavelength utilization efficiency while improving the signal quality by adjusting the wavelength spacings of all of the channels in the WDM signal. Moreover, compared with the related techniques, it is possible to adjust the wavelength spacings between the channels in the WDM signal in a short time. Thus, it is possible to adjust both of the signal quality and the wavelength utilization efficiency in a WDM signal in a short time and with a favorable balance.

The optical level P2 in the first embodiment is a reference optical level corresponding to, in the WDM transmission system 1, a guaranteed BER for a wavelength at which a designated channel and an adjacent channel interfere with each other. According to the WDM transmission system 1, it is possible to ensure the signal quality and the wavelength utilization efficiency that are guaranteed in the communication environment of the WDM transmission system 1.

The reception node 3 shifts and adjusts the central wavelength in the adjacent channel in the group in the frequency-increasing direction so that the determined ratio P0/P1 and the reference ratio P0/P2 become equal to each other. As a result of the processing, it is possible to adjust the wavelength spacings of all of the channels in the WDM signal.

When the determined ratio P0/P1 is smaller than the reference ratio P0/P2, the reception node 3 shifts and adjusts the central wavelength in the adjacent channel in the frequency-increasing direction. As a result, the wavelength spacing between the designated channel and the adjacent channel is increased as illustrated in FIG. 4B. Thus, the interference between the channels in the group is mitigated, so that the signal quality can be improved.

When the determined ratio P0/P1 is larger than the reference ratio P0/P2, the reception node 3 shifts and adjusts the central wavelength in the adjacent channel in the frequency-decreasing direction. As a result, the wavelength spacing between the designated channel and the adjacent channel is reduced as illustrated in FIG. 5B, thus making it possible to suppress a decline in the utilization efficiency of wavelengths in the channels in the group.

When the determined ratio P0/P1 and the reference ratio P0/P2 in the group become equal to each other, the reception node 3 sequentially designates the adjacent channel as a designated channel until the second channel from the end in the group is designated as an adjacent channel in the group. In addition, the reception node 3 sequentially designates, as an adjacent channel, the channel that is adjacent to the designated channel in the frequency-increasing direction. With this arrangement, starting from the fixed channel in each group in a WDM signal, the reception node 3 can sequentially adjust the wavelength spacings of all of the channels in the group in the frequency-increasing direction.

The reception node 3 sends, to the transmission node 2, an adjustment signal for adjusting the wavelength spacing between the designated channel and the adjacent channel in the same group in a WDM signal. In the transmission node 2, the optical transmitter 11 for which the wavelength spacing between the designated channel and the adjacent channel in the group is to be sequentially adjusted is identified for each group, based on the identification information in the adjustment signal. In addition, in the transmission node 2, the wavelength spacing is sequentially adjusted for the identified optical transmitter 11. Accordingly, during transmission of a WDM signal, the wavelength spacings of all of the channels in the WDM signal are adjusted, so that the balance between the signal quality and the wavelength utilization efficiency can be adjusted in a short time.

In the first embodiment, of the multiple channels in each group, the wavelength band at the highest frequency, that is, the last channel located at the last end in the frequency-increasing direction, is set as a signal-less channel. As a result, it is possible to ensure the wavelength bandwidth of the last channel as an adjustable amount in the frequency-increasing direction in the group.

In the first embodiment, the channel at the lowest frequency in each group is set as a fixed channel, and the channel that is adjacent to a designated channel in the frequency-increasing direction is sequentially designated as an adjacent channel. Thus, since the channel λ1 at the lowest frequency in the first group is not shifted and adjusted in the frequency direction, an increase in the bandwidth of the optical amplifier 21 in the reception node 3 may be disregarded.

Although filterless digital coherent receivers are employed as the optical receivers 23 in the WDM transmission system 1 according to the first embodiment described above, optical receivers using variable-wavelength filters may also be employed instead of digital coherent receivers. An illustrative example in such a case will be described below as a second embodiment.

[Second Embodiment]

Figure 8:
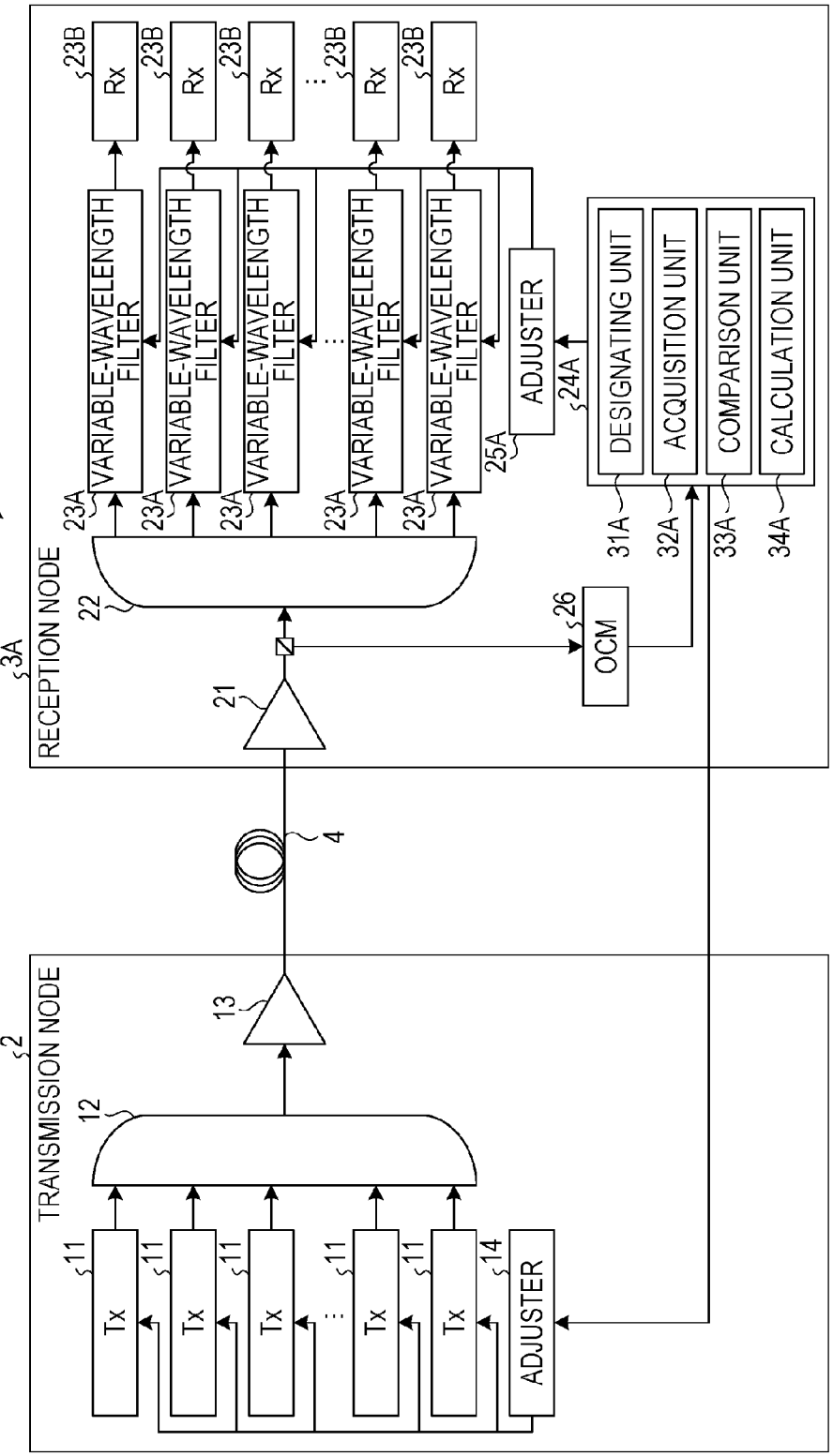
FIG. 8 is a block diagram illustrating an example of a WDM transmission system according to a second embodiment.

FIG. 8 is a block diagram illustrating an example of a WDM transmission system according to the second embodiment. In FIG. 8, elements that are the same as or similar to those in the WDM transmission system 1 illustrated in FIG. 1 are denoted by the same reference numerals, and descriptions of the redundant elements and operations are not given hereinafter.

A reception node 3A in a WDM transmission system 1A illustrated in FIG. 8 has variable-wavelength filters 23A and optical receivers 23B, instead of the optical receivers 23 implemented by digital coherent receivers. The variable-wavelength filters 23A extract, from a WDM signal from an optical demultiplexer 22, optical signals in desired wavelength bands corresponding to set filter bands. The optical receivers 23B receive the optical signals in the wavelength bands, the optical signals being extracted by the corresponding variable-wavelength filters 23A.

The reception node 3A has an optical channel monitor (OCM) 26, a controller 24A, and an adjuster 25A. The OCM 26 monitors the signal states of all channels in a WDM signal amplified by an optical amplifier 21. In addition, the OCM 26 acquires the spectrum of all of the channels from the WDM signal and reports the spectrum of each channel to the controller 24A.

The controller 24A acquires the spectrum of all of the channels in the WDM signal, the spectrum being reported from the OCM 26, and groups the WDM signal into first to eighth groups in units of 12 wavelength bands, as illustrated in FIG. 2. The controller 24A has a designating unit 31A, an acquisition unit 32A, a comparison unit 33A, and a calculation unit 34A.

The designating unit 31A designates an arbitrary channel in each group as a designated channel and also designates an adjacent channel that is adjacent to the designated channel in the frequency-increasing direction. The acquisition unit 32A acquires the spectrum of all of the channels in the WDM signal via the OCM 26. The acquisition unit 32A acquires a peak level P0, which is the optical level at the central wavelength for each channel. The acquisition unit 32A acquires an optical level P1 at a wavelength at which the designated channel and the adjacent channel interfere with each other.

The comparison unit 33A determines a determined ratio P0/P1, based on the peak level P0 in the designated channel and the optical level P1 at the wavelength at which the designated channel and the adjacent channel interfere with each other. The comparison unit 33A obtains a reference ratio P0/P2 to be compared with the determined ratio P0/P1. The comparison unit 33A compares the determined ratio P0/P1 with the reference ratio P0/P2. When the result of the comparison indicates that the determined ratio P0/P1 is smaller than the reference ratio P0/P2, the calculation unit 34A calculates an adjustment amount by which the central wavelength in the adjacent channel is to be adjusted in the frequency-increasing direction, and sends, to the adjuster 14 in the transmission node 2, a first adjustment signal for adjusting the central wavelength in the adjacent channel in the frequency-increasing direction. The first adjustment signal includes an adjustment amount by which the central wavelength in the adjacent channel is to be shifted and adjusted in the frequency-increasing direction and also identification information for identifying the optical transmitter 11 for which the central wavelength in the adjacent channel is to be adjusted.

Based on the identification information in the first adjustment signal from the controller 24A, the adjuster 14 in the transmission node 2 identifies the optical transmitter 11 which corresponds to the adjacent channel and for which the central wavelength in the adjacent channel is to be adjusted. Based on the adjustment amount in the first adjustment signal, the adjuster 14 adjusts the central wavelength in the adjacent channel for the identified optical transmitter 11. The optical transmitter 11 transmits an optical signal in the adjacent channel having the adjusted central wavelength.

When the determined ratio P0/P1 is smaller than the reference ratio P0/P2, the calculation unit 34A sends, to the adjuster 25A, a second adjustment signal for adjusting the filter band for the variable-wavelength filter 23A corresponding to that adjacent channel in the frequency-increasing direction. The second adjustment signal includes an adjustment amount by which the central wavelength in the adjacent channel is to be shifted and adjusted in the frequency-increasing direction and also identification information for identifying the variable-wavelength filter 23A which corresponds to the adjacent channel and for which the filter band is to be adjusted.

Based on the identification information in the second adjustment signal from the controller 24A, the adjuster 25A identifies the variable-wavelength filter 23A which corresponds to the adjacent channel and for which the filter band is to be adjusted. Based on the adjustment amount in the second adjustment signal, the adjuster 25A adjusts the filter band for the identified variable-wavelength filter 23A. Following the adjacent channel for which the transmission node 2 has adjusted the wavelength spacing in the frequency-increasing direction, the optical receiver 23B receives an optical signal in that adjacent channel.

When the determined ratio P0/P1 is larger than the reference ratio P0/P2, the calculation unit 34A calculates an adjustment amount by which the central wavelength in the adjacent channel is to be adjusted in the frequency-decreasing direction, and sends, to the adjuster 14 in the transmission node 2, the first adjustment signal including the adjustment amount by which the central wavelength in the adjacent channel is to be shifted and adjusted in the frequency-decreasing direction and also identification information for identifying the optical transmitter 11 for which the central wavelength in the adjacent channel is to be adjusted.

Based on the identification information in the first adjustment signal from the controller 24A, the adjuster 14 in the transmission node 2 identifies the optical transmitter 11 which corresponds to the adjacent channel and for which the central wavelength in the adjacent channel is to be adjusted. Based on the adjustment amount in the first adjustment signal, the adjuster 14 adjusts the central wavelength in the adjacent channel for the identified optical transmitter 11. The optical transmitter 11 transmits an optical signal in the adjacent channel having the adjustment central wavelength.

When the determined ratio P0/P1 is larger than the reference ratio P0/P2, the calculation unit 34A sends, to the adjuster 25A, the second adjustment signal for adjusting, in the frequency-decreasing direction, the filter band for the variable-wavelength filter 23A corresponding to that adjacent channel.

Based on the identification information in the second adjustment signal from the controller 24A, the adjuster 25A identifies the variable-wavelength filter 23A corresponding to the adjacent channel. Based on the adjustment amount in the second adjustment signal, the adjuster 25A adjusts the filter band for the identified variable-wavelength filter 23A. The optical receiver 23B receives the optical signal in the adjacent channel, the optical signal being extracted by the variable-wavelength filter 23A. Following the adjacent channel for which the transmission node 2 has adjusted the wavelength spacing in the frequency-decreasing direction, the optical receiver 23B receives an optical signal in that adjacent channel.

When the determined ratio P0/P1 is equal to the reference ratio P0/P2, the designating unit 31A designates the next designated channel $\lambda i-1$ in the frequency-increasing direction. The designating unit 31A determines whether or not the designated channel is the second channel $\lambda n-2$ from the last channel $\lambda n$ in the group.

When the designated channel $\lambda i$ is the second channel $\lambda n-2$ from the last channel $\lambda n$, the controller 24A decides that the adjustment of the wavelength spacings of all of the channels in the group is completed.

When the designated channel $\lambda i$ is not the second channel $\lambda n-2$ from the last channel $\lambda n$, the controller 24A acquires the peak level P0 in the next designated channel $\lambda i$ in the group.

The controller 24A then executes the wavelength-spacing adjustment processing for adjusting the wavelength spacings of all of the channels in each group with respect to the first to eighth groups independently from each other and in parallel. That is, since the processes for adjusting the wavelength spacings of all of the channels in the corresponding groups are executed for the respective groups in the wavelength-spacing adjustment processing, it is possible to significantly reduce the amount of time taken for adjusting the wavelength spacings of all of the channels in a WDM signal.

In the reception node 3A in the second embodiment, when the determined ratio P0/P1 for the designated channel and the adjacent channel in the group is smaller than the reference ratio P0/P2, the central wavelength in the adjacent channel for the optical transmitter 11 corresponding to the adjacent channel and the filter band for the variable-wavelength filter 23A are adjusted in the frequency-increasing direction. As a result, the frequency spacing between the designated channel and the adjacent channel is increased, so that the optical level P1 at a wavelength at which the designated channel and the adjacent channel interfere with each other decreases to the optical level P2, as illustrated in FIG. 4B. Thus, the interference between the designated channel and the adjacent channel in the group is mitigated, so that signal quality can be improved.

In the reception node 3A in the second embodiment, when the determined ratio P0/P1 for the designated channel and the adjacent channel in the group is larger than the reference ratio P0/P2, the central wavelength in the adjacent channel for the optical transmitter 11 corresponding to the adjacent channel and the filter band for the variable-wavelength filter 23A are adjusted in the frequency-decreasing direction. As a result, the frequency spacing between the designated channel and the adjacent channel is reduced, and the optical level P1 at the wavelength at which the designated channel and the adjacent channel interfere with each other increases to the optical level P2, as illustrated in FIG. 5B. Thus, it is possible to suppress a decline in the utilization efficiency of wavelengths in the designated channel and the adjacent channel in the group.

By adjusting the wavelength spacing between the channels in a WDM signal, the WDM transmission system 1A in the second embodiment mitigates interference between the channels so that the interference reaches a predetermined reference level or below, thereby suppressing a decline in the wavelength utilization efficiency while improving the signal quality. Moreover, since the processing for adjusting the wavelength spacings of all of the channels in a WDM signal is performed for each group, it is possible to significantly reduce the time for the processing.

Furthermore, the WDM transmission system 1A is also applicable to the reception node 3A employing the variable-wavelength filters 23A and the optical receivers 23B, without employing filterless digital coherent receivers.

When the determined ratio P0/P1 and the reference ratio P0/P2 are equal to each other, the controller 24 (24A) in the above-described embodiment is adapted to stop the adjustment signal for adjusting the wavelength spacing between the designated channel and the adjacent channel. However, when the determined ratio P0/P1 and the reference ratio P0/P2 are equal to each other, the controller 24 (24A) may also output an adjustment signal for maintaining and adjusting the wavelength spacing.

In the above-described embodiments, the channel at the lowest frequency in each group is set as a fixed channel, and the channel that is adjacent to the designated channel in the frequency-increasing direction is sequentially designated as an adjacent channel. The arrangement, however, may also be such that the channel at the highest frequency in each group is set as a fixed channel, channels are sequentially designated in the frequency-decreasing direction starting from the fixed channel, and the channel that is adjacent to the designated channel in the frequency-decreasing direction is sequentially designated as an adjacent channel. In this case, the channel at the lowest frequency in the group may also be set as a signal-less channel used as the last channel.

In the above-described embodiments, the channel at the highest frequency in each group is set as a signal-less channel used as the last channel λn. However, rather than being limited to a single channel, that is, the last channel λn, for example, two channels, for example, the last channel λn and the channel λn−1, may also be used as signal-less channels. The number of signal-less channels may be changed as appropriate.

Although a case in which a WDM signal is grouped in units of 12 wavelength bands has been described in the above embodiments, the grouping is not limited to 12 wavelength bands and may be modified as appropriate. In addition, although a case in which a WDM signal is grouped in units of 12 wavelength bands has been described above, the number of wavelength bands is not limited to a predetermined number, and the grouping may be performed with different numbers of wavelength bands for the groups.

Although a case in which the controller 24 (24A) is included in the reception node 3 has been described in the above embodiments, the arrangement may also be such that, for example, a controller is included in the transmission node 2 and further a spectrum acquisition unit for acquiring the spectrum of the channels in a WDM signal is provided at an output stage of the optical multiplexer 12 in the transmission node 2. In such a case, the controller in the transmission node 2 acquires the optical level at each channel from the spectrum acquisition unit provided at the output stage of the optical multiplexer 12. The controller in the transmission node 2 may also be adapted to send an adjustment signal to the adjuster 14 in the transmission node 2 and the adjuster 25 in the reception node 3, based on the result of the comparison of the determined ratio P0/P1 with the reference ratio P0/P2 in each group. This arrangement allows the transmission node 2 to determine the adjustment signal.

Although the above embodiments have been applied to a WDM signal by way of example, they are also applicable to any other system that uses a multiplexed optical signal in which wavelengths are multiplexed. For example, the embodiments are also applicable to colorless, directionless, and contentionless (CDC) reconfigurable optical add-drop multiplexers (ROADMs).

The constituent elements of the illustrated units and portions may or may not be physically configured as illustrated. That is, specific forms of distribution/integration of the units and portions are not limited to those illustrated, and all or any part thereof may be functionally or physically distributed or integrated in an arbitrary manner, depending on various loads, usage states, and so on.

In addition, all or any of the various processing functions of each apparatus may also be executed by a central processing unit (CPU) (or a microcomputer, such as a micro processing unit (MPU) or a micro controller unit (MCU)). Needless to say, all or any of the processing functions may also be executed on a program analyzed and executed by a CPU (or a microcomputer, such as an MPU or MCU) or on wired-logic-based hardware.

Figure 9:
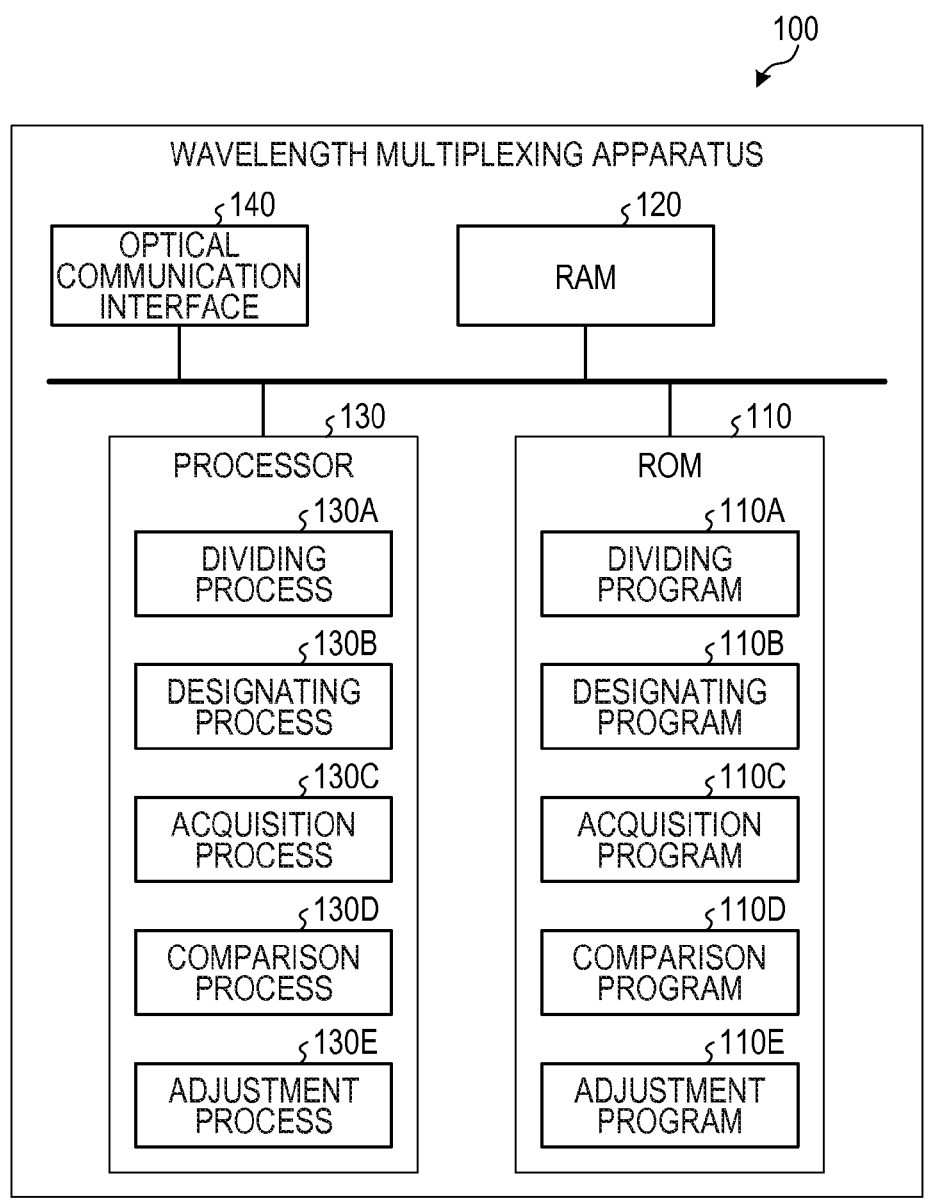
FIG. 9 is a block diagram illustrating a wavelength multiplexing apparatus that executes a wavelength multiplexing program.

The various processes described in the above embodiments may be realized by executing a prepared program with an optical module. Accordingly, a description below will be given of an example of a wavelength multiplexing apparatus, such as an optical module, that executes a program having functions that are equivalent to those in the above-described embodiments. FIG. 9 is a block diagram illustrating a wavelength multiplexing apparatus 100 that executes a wavelength multiplexing program.

As illustrated in FIG. 9, the wavelength multiplexing apparatus 100 that executes a wavelength multiplexing program includes a ROM 110, a RAM 120, a processor 130, and an optical communication interface 140.

The wavelength multiplexing program is a program that provides functions equivalent to those in the above-described embodiments, and is pre-stored in the ROM 110. The wavelength multiplexing program may also be recorded in a recording medium that is readable via a drive (not illustrated), rather than in the ROM 110. Examples of the recording medium include portable recording media, such as a compact disk read-only memory (CD-ROM), a digital versatile disk (DVD), a Universal Serial Bus (USB) memory, and a Secure Digital (SD) card, and semiconductor memories, such as a flash memory. The wavelength multiplexing program may also be obtained from a storage device that is capable of communication over a network. As illustrated in FIG. 9, the wavelength multiplexing program includes a dividing program 110A, a designating program 110B, an acquisition program 110C, a comparison program 110D, and an adjustment program 110E. The programs 110A, 110B, 110C, 110D, and 110E may be integrated together or distributed as appropriate.

The processor 130 reads the programs 110A to 110E from the ROM 110 and executes each of the read programs 110A to 110E. The processor 130 causes the programs 110A to 110E to function as a dividing process 130A, a designating process 130B, an acquisition process 130C, a comparison process 130D, and an adjustment process 130E.

The processor 130 divides a multiplexed optical signal, in which channels in different wavelength bands are multiplexed, into a plurality of groups each including a plurality of channels. The processor 130 designates, for each group, an arbitrary channel of the channels in the group as a designated channel and also designates an adjacent channel that is adjacent to the designated channel in a predetermined frequency direction. The processor 130 acquires a first optical level at the central wavelength in the designated channel and a second optical level at a wavelength at which the designated channel and the adjacent channel interfere with each other. The processor 130 compares a determined ratio of the second optical level to the first optical level with a reference ratio of a third optical level to the first optical level. In addition, based on the result of the comparison, the processor 130 adjusts the wavelength spacing between the designated channel and the adjacent channel in the group with respect to the optical communication interface 140. Since the wavelength spacings of all of the channels in each of the groups in a multiplexed optical signal are adjusted, it is possible to reduce the time for adjusting the wavelength spacings in the multiplexed optical signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wavelength multiplexing apparatus, comprising:
  a dividing unit configured to divide a multiplexed optical signal, in which optical signals of channels in different wavelength bands are multiplexed, into a plurality of groups each including a plurality of channels;
  a designating unit configured to designate, for each group, an arbitrary channel of the channels in the group as a designated channel and to designate an adjacent channel that is adjacent to the designated channel in a predetermined frequency direction;
  an acquisition unit configured to acquire a first optical power level at a central wavelength in the designated channel and a second optical power level at a wavelength at which the designated channel and the adjacent channel interfere with each other; a comparison unit configured to compare a determined ratio of the second optical power level to the first optical power level with a reference ratio of a third optical power level to the first optical power level; and
  an adjustment unit configured to adjust a wavelength spacing between the designated channel and the adjacent channel in the group, based on a result of the comparison.

2. The wavelength multiplexing apparatus according to claim 1, wherein the third optical power level is an optical level at a wavelength at which adjacent channels in the group interfere with each other and is to be guaranteed in a communication environment of the wavelength multiplexing apparatus.

3. The wavelength multiplexing apparatus according to claim 2,
  wherein the adjustment unit shifts a central wavelength in the adjacent channel so that the determined ratio and the reference ratio become equal to each other.

4. The wavelength multiplexing apparatus according to claim 3,
  wherein, when the determined ratio is smaller than the reference ratio, the adjustment unit shifts the central wavelength in the adjacent channel in the predetermined frequency direction; and
  when the determined ratio is larger than the reference ratio, the adjustment unit shifts and adjusts the central wavelength in the adjacent channel in a direction opposite to the predetermined frequency direction.

5. The wavelength multiplexing apparatus according to claim 2,
  wherein, in order that the determined ratio and the reference ratio become equal to each other, the adjustment unit adjusts a filter frequency in a filter band from which a frequency corresponding to a central wavelength in the adjacent channel is to be extracted.

6. The wavelength multiplexing apparatus according to claim 5,
  wherein, when the determined ratio is smaller than the reference ratio, the adjustment unit shifts the filter frequency in the predetermined frequency direction; and
  when the determined ratio is larger than the reference ratio, the adjustment unit shifts the filter frequency in a direction opposite to the predetermined frequency direction.

7. The wavelength multiplexing apparatus according to claim 3,
  wherein, when the determined ratio in the group becomes equal to the reference ratio, the designating unit designates, in the group, the adjacent channel as a designated channel until a second channel from an end in the group is designated as the adjacent channel and designates, as an adjacent channel, a channel that is adjacent to the designated channel in the predetermined frequency direction.

8. The wavelength multiplexing apparatus according to claim 5,
  wherein, when the determined ratio in the group becomes equal to the reference ratio, the designating unit designates, in the group, the adjacent channel as a designated channel until a second channel from an end in the group is designated as the adjacent channel and designates, as an adjacent channel, a channel that is adjacent to the designated channel in the predetermined frequency direction.

9. The wavelength multiplexing apparatus according to claim 1,
  wherein the multiplexed optical signal is transmitted from another wavelength multiplexing apparatus, and the adjustment unit notifies the another wavelength multiplexing apparatus so as to adjust the wavelength spacing between the designated channel and the adjacent channel in the same group in a multiplexed optical signal to be transmitted.

10. The wavelength multiplexing apparatus according to claim 1,
  wherein, of the channels in the group, a last channel located at a last end in the predetermined frequency direction is set as a signal-less channel.

11. The wavelength multiplexing apparatus according to claim 1,
  wherein the predetermined frequency direction is a direction in which a frequency in the channels increases.

12. The wavelength multiplexing apparatus according to claim 1,
wherein the predetermined frequency direction is a direction in which a frequency in the channels decreases.

13. A wavelength multiplexing method for a wavelength multiplexing apparatus that receives a multiplexed optical signal in which optical signals of channels in different wavelength bands are multiplexed, the wavelength multiplexing method comprising:
dividing the multiplexed optical signal into a plurality of groups each including a plurality of channels;
designating, for each group, an arbitrary channel of the channels in the group as a designated channel and designating an adjacent channel that is adjacent to the designated channel in a predetermined frequency direction;
acquiring a first optical power level at a central wavelength in the designated channel and a second optical power level at a wavelength at which the designated channel and the adjacent channel interfere with each other;
comparing a determined ratio of the second optical power level to the first optical power level with a reference ratio of a third optical power level to the first optical power level; and adjusting a wavelength spacing between the designated channel and the adjacent channel in the group, based on a result of the comparison.

14. A non-transitory computer-readable recording medium storing a program that causes a computer to execute a procedure, the procedure comprising:
dividing a multiplexed optical signal into a plurality of groups each including a plurality of channels, the multiplexed optical signal in which optical signals of channels in different wavelength bands are multiplexed, being received;
designating, for each group, an arbitrary channel of the channels in the group as a designated channel and designating an adjacent channel that is adjacent to the designated channel in a predetermined frequency direction;
acquiring a first optical power level at a central wavelength in the designated channel and a second optical power level at a wavelength at which the designated channel and the adjacent channel interfere with each other;
comparing a determined ratio of the second optical power level to the first optical power level with a reference ratio of a third optical power level to the first optical power level; and adjusting a wavelength spacing between the designated channel and the adjacent channel in the group, based on a result of the comparison.

* * * * *